United States Patent [19]

Wille

[11] Patent Number: 4,471,760

[45] Date of Patent: Sep. 18, 1984

[54] COMBINED SOLAR HEATER AND COLLECTOR

[76] Inventor: Franklin P. Wille, 123 Maple Dr., Knollwood East, Mankato, Minn. 56001

[21] Appl. No.: 561,687

[22] Filed: Dec. 15, 1983

[51] Int. Cl.³ ............................................. F24J 3/02
[52] U.S. Cl. ................................ 126/429; 126/430; 126/436; 126/450
[58] Field of Search ............... 126/417, 418, 426, 429, 126/430, 432, 436, 437, 400, 441, 449, 450

[56] References Cited

U.S. PATENT DOCUMENTS

| | | | |
|---|---|---|---|
| 2,484,127 | 10/1949 | Stelzer | 126/430 |
| 3,012,294 | 12/1961 | Waldor | 126/429 |
| 3,997,108 | 12/1976 | Mason | 126/430 |
| 4,002,159 | 1/1977 | Angilletta | 126/429 |
| 4,029,258 | 6/1977 | Groth | 126/430 |
| 4,061,267 | 12/1977 | Lof | 126/430 |
| 4,063,546 | 12/1977 | Schmid et al. | 126/436 |
| 4,068,652 | 1/1978 | Worthington | 126/430 |
| 4,071,016 | 1/1978 | Henderson | 126/436 |
| 4,088,266 | 5/1978 | Keyes | 126/430 |
| 4,100,914 | 7/1978 | Williams | 126/429 |
| 4,111,185 | 9/1978 | Swann | 126/436 |
| 4,267,825 | 5/1981 | Ward | 126/436 |
| 4,289,117 | 9/1981 | Butcher | 126/436 |
| 4,303,058 | 12/1981 | Chun | 126/436 |
| 4,324,226 | 4/1982 | Beck | 126/436 |
| 4,338,918 | 7/1982 | Milburn | 126/430 |

*Primary Examiner*—Daniel J. O'Connor
*Attorney, Agent, or Firm*—Williamson, Bains, Moore & Hansen

[57] ABSTRACT

A combined solar collector and storage device comprises a housing including a plurality of wire mesh racks for retaining and storing rock therein and also including a front face formed of mesh allowing solar radiation to impinge on the rock and penetrate deeply into the housing. A plurality of intersecting tunnels being formed of mesh include a plurality of sunlight entry tunnels and inner chamber tunnels wherein the inner chamber tunnels intersect the sunlight entry tunnels at closely spaced intervals so that solar radiation may be directed toward rock in the interior of the housing. The housing also includes a frame, a plurality of side walls and a base, which cooperate with the front face to retain the rock within the housing.

16 Claims, 5 Drawing Figures

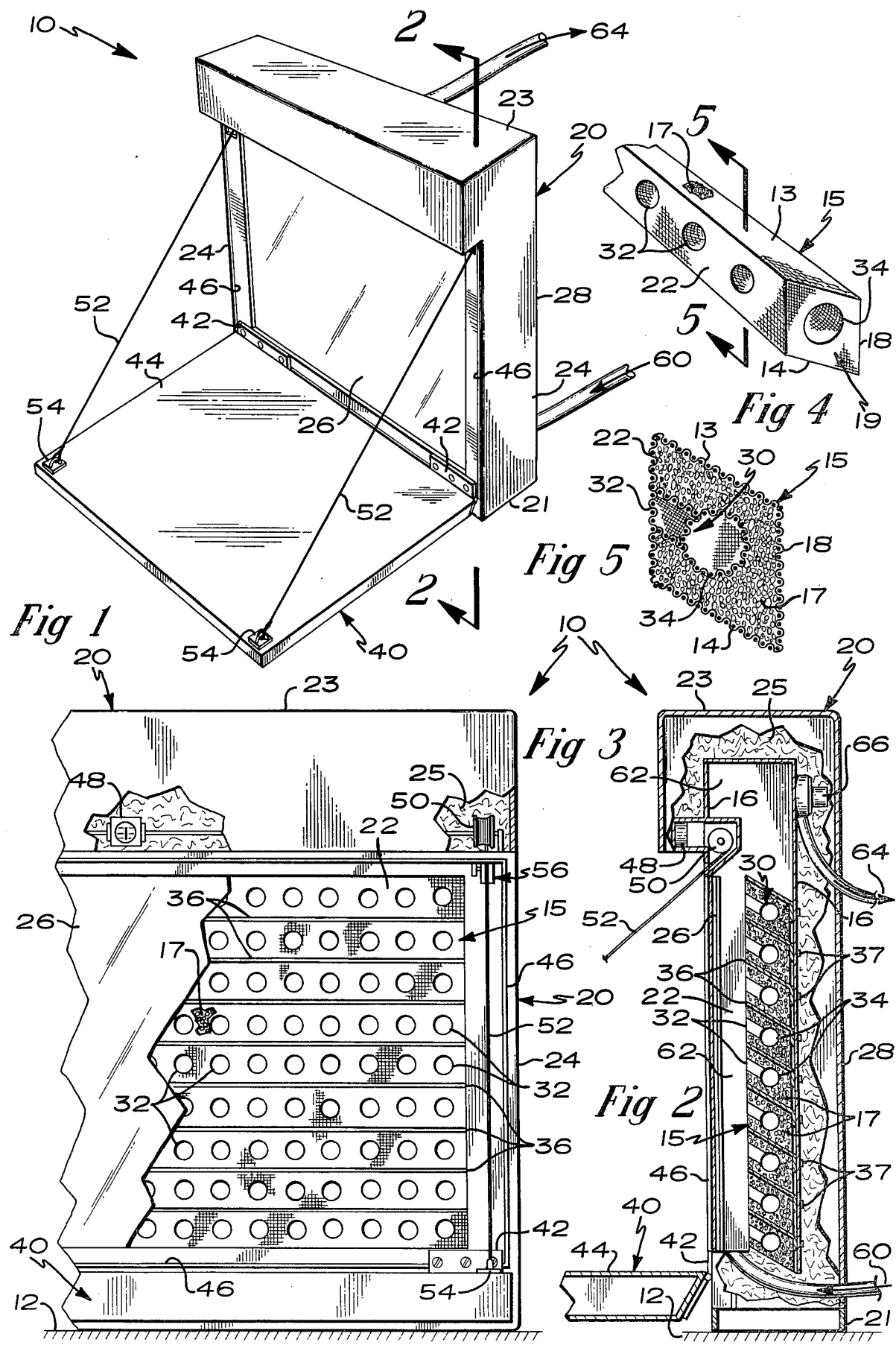

COMBINED SOLAR HEATER AND COLLECTOR

BACKGROUND OF THE INVENTION

This invention relates to the field of solar heating and collection systems and provides a new collection and storage device for collecting and retaining solar energy within the solar collector over a relatively long period of time.

It is well known in the solar heating art to utilize a solar collector to capture heat from the sun's rays. Typically, such captured heat is then moved by a heat exchanger to a second location where the heat is stored thereby resulting in some amount of heat loss during transmission. In most applications utilizing a solar heating system, it is therefore desirable to have a solar heating system which collects and stores the solar energy without the necessity of transferring the heat and utilizing a remote storage facility to store the captured heat.

The use of a solid material, such as rock, for the storage media is well known. U.S. Pat. No. 3,369,541 is indicative of rock being used as the storage media. Little emphasis has been placed, however, on the manner in which the rock is arranged and retained within the solar heater and collection system. Accordingly, it is desirable not only to provide a sufficient storage media for storing the solar energy but also to provide a container which reliably retains the storage media and facilitates maximum heat retention by the storage media.

A problem encountered by combined solar heaters and collectors of the prior art is that the interior rock within the solar collectors did not receive sufficient direct sunlight within the collector to permit the collector to fully utilize the internal heat storage capacity. U.S. Pat. No. 4,059,226 discloses a solar energy heat collector and storage chamber which utilizes an air circulation means and alternating baffle structure to heat the interior rock chamber. The major problem with a solar heater and collector as disclosed in U.S. Pat. No. 4,059,226 is that the solar radiation only impinges on the front face of the solar collector and the only means to transport heat to the interior rock is air circulation. Such a device does not fully utilize the potential solar energy storage capacity of the interior rock. It is therefore highly desirable to provide for a means by which the solar radiation has as direct an access as is possible to the interior rock so that the interior rock can attain its potential heat storage capacity.

With the above problems in mind, it is desirable to provide an improved combined solar heater and collection system which collects and stores the solar energy without the necessity of a heat exchanger to move the captured heat to a second location where the heat is stored.

It has also been found desirable to provide an improved combined solar heat and collection system which contains not only an inexpensive and effective storage media for storing the solar energy but also a housing which reliably retains the storage media while at the same time providing a system which easily transports the generated hot air within the housing for effective discharge.

It has further been found desirable to provide an improved combined solar heater and collection system which will allow for access of solar radiation to the interior storage media in as direct a manner as is possible so that the interior rock can realize its potential heat storage capacity.

The present invention is directed toward solving these problems and provides a workable and economical solution for them.

SUMMARY OF THE INVENTION

A combined solar collector and storage device allows solar radiation to be collected and stored at the same location and includes a housing having a front face, a front window, a plurality of side walls, a rear wall, a frame and a top wall. The rigid housing also includes a plurality of wire mesh racks which retains and stores a quantity of rock therein. The front face, side wall, rear wall, base and top wall cooperate to form the configuration of the housing and thereby aid in the retention of the rock within the housing. The front face of the housing also is formed so that the solar radiation may impinge directly on the rock filling the housing. The solar radiation is then capable of penetrating deeply into the interior rock.

The invention also utilizes a plurality of intersecting tunnels which are also formed of the rigid wire mesh and include a plurality of sunlight entry tunnels and a plurality of inner chamber tunnels. The sunlight entry tunnels have their longitudinal axes generally aligned with the direction of the sun's rays so that the solar radiation may directly impinge into the sunlight entry tunnels. The inner chamber tunnels are situated in the interior rock area and intersect the sunlight entry tunnels at closely spaced intervals so that solar radiation directly impinging on the sunlight entry tunnels may be guided to the inner chamber tunnels thereby aiding the interior rocks in reaching their potential heat storage capacity.

The invention further utilizes a front insulating door which is hingedly connected to the base of the housing and is movable between an open position, wherein solar radiation is allowed to impinge directly onto the front face of the housing, and a closed position, wherein the front insulating door closely abuts against the front window of the housing thereby retaining solar energy within the housing during hours of darkness. The front insulating door also includes a sunlight reflecting surface along its inner surface which promotes solar radiation to be reflected and impinge on the front face of the housing when the front insulating door is in its open position. A gasket encompasses the front face of the housing allowing the front insulating door in its closed position to be closely confined adjacent the front window to reduce heat loss.

The manipulation of the front insulation door between its open and closed positions is facilitated by a door motor, winch and cable assembly. A door motor is mounted to the housing and is the driving mechanism for a winch which is connected adjacent thereto. A cable extending from the front insulating door to the winch and encompassing the winch permits the front insulating door to be automatically moved between its open and closed positions when the door motor is activated. A door switch is utilized to stop the door motor when the front insulation door is sealed tightly by the gasket in its closed position.

The invention is also structured to permit the introduction of cold air within the housing which is subsequently heated by the heating potential of the rock for discharge as hot air. The housing provides for a cold air inlet wherein cold air enters the housing. The cold air is guided into a heat collection chamber wherein the air is heated by the warm rocks. A fan is provided to direct the hot air from the heat collection chamber to the hot air outlet for subsequent discharge. The fan is driven by a hot air discharge motor.

The rocks adjacent the front face of the housing are painted with a flat paint highly suitable for energy absorption. Such a coating increases the heat absorption of the rock.

Other objects and advantages of the invention will become apparent from the following detailed description and from the appended drawings in which like numbers have been used to describe like parts of the several views.

DESCRIPTION OF THE DRAWINGS

FIG. 1 is a front perspective view of an embodiment of the combined solar collector and storage device.

FIG. 2 is a side cross sectional view taken along cutting plate 2—2 of FIG. 1.

FIG. 3 is a front partially cut-away view of the combined solar collector and storage device of FIG. 1.

FIG. 4 is an enlarged front perspective view of the intersecting tunnels of the device.

FIG. 5 is a cross-sectional side view of the intersecting tunnels of FIG. 4 taken in the direction of cutting plane 5—5 of FIG. 4.

DESCRIPTION OF THE PREFERRED EMBODIMENT

Referring now to FIG. 1, a combined solar collector and storage device 10 is positioned above the ground surface 12 and includes a housing 20 having a base 21, a front face 22, a top wall 23, a plurality of side walls 24, a clear front window 26, a frame 16 and a rear wall 28. The base 21 is supported above the ground surface 12 in a rigid permanent fashion in any manner known to the art. The rear wall 28 is preferably formed of plywood, metal or any other suitable material and is joined to the base 21. The side walls 24 are also joined to the base 21.

The housing 20 also includes a plurality of wire mesh racks 15 which retain and store a quantity of rock 17. Preferably, a reasonable size diameter rock 17 in the one to two inch diameter size range is placed within the wire mesh rack 15. The arrangement of the rock 17 within the housing 20 is illustrated in FIGS. 2 and 5. As shown in FIGS. 4 and 5, the wire mesh racks 15 may include a top 13, a bottom 14, a back 18 and a plurality of sides 19. However, in an alternative embodiment, the top 13, back 18 and the sides 19 are not necessary for the device 10 to function properly. The front face 22, the base 21, the frame 16 and the side walls 24 cooperate to retain the rock 17 within the housing 20. The heat absorbing capacity of the rock 17 may be increased by painting the rock 17 with a flat paint highly suitable for energy absorption.

A plurality of intersecting tunnels 30 is generally illustrated in FIGS. 2, 4 and 5. The intersecting tunnels 30 include a plurality of sunlight entry tunnels 32 and a plurality of inner chamber tunnels 34, both preferably formed of one inch square metal mesh. The wire mesh racks 15 define the walls of the sunlight entry tunnels 32 and inner chamber tunnels 34. The sunlight entry tunnels 32 are arranged at closely spaced intervals. The sunlight entry tunnels 32 are intersected by a plurality of inner chamber tunnels 34. The inner chamber tunnels 34 are horizontally aligned at closely spaced intervals and pass through the interior rock 17. The longitudinal axes of the sunlight entry tunnels 32 are generally aligned with the direction of the sun's rays so that solar radiation may directly impinge on the sunlight entry tunnels 32 and pass through the sunlight entry tunnels 32 until the solar radiation is diverted into the inner chamber tunnels 34 and traverses through the inner chamber tunnels 34 so that the interior rock can realize its potential heat storage capacity.

As shown in FIG. 2, the wire mesh racks 15 holding the rock 17 are supported and braced by separation brackets 36. The separation brackets 36 are engaged to the frame 16 by bolt 37. The separation brackets 36 also provide for the inner chamber tunnels 34 to be separated at predetermined closely spaced intervals so that the interior rock 17 will receive a generally even distribution of solar radiation which traverses through the individual inner chamber tunnels 34. The brackets 36 may be aligned either horizontally or vertically depending on the user's place of construction. The brackets 36 also permit the racks 15 and the tunnels 32 and 34 to be stacked and spaced in a modular arrangement as shown in FIG. 4. This provides for expansion or reduction of the rock supply 17 within the housing 20.

The invention 10 also includes a front insulating door 40 which is connected to the housing 20 by means of hinges 42. The front insulating door 40 is movable between an open position, as shown in FIG. 1, wherein solar radiation is allowed to impinge directly onto the front face 22 of the housing 20, and a closed position (not shown), wherein the front insulating door 40 closely confronts the window 26 so that solar energy may be retained within the housing 20 during conditions when the sun's rays have been diminished. For instance, such conditions are present during nighttime or prolonged overcast periods.

The inner surface 44 of the door 40 is coated with sunlight reflecting material. This permits solar radiation impinging on the door 40 when the door 40 is in its open position to be reflected onto the front face 22 of the housing 20 and thereby increases the potential solar radiation which impinges upon the front face 22 of the housing 20.

The housing 20 also includes a gasket 46 adjacent the front window 26 which permits the front insulating door 40 to sealably close against the front window 26 of the housing 20 when the door 40 is in its closed position. This prevents most stored energy from escaping the housing 20 and thus increases the potential heat storage capacity which may be retained by the housing 20 when the door 40 is in its closed position.

The movement of the door 40 between its open and closed positions is facilitated by a door motor 48 which is mounted adjacent the frame 16. The door motor 48 drives a winch 50 connected adjacent thereto. A cable 52 is attached to the door 40 by cable connectors 54 and extends to and is connected with the winch 50. Upon actuation of the door motor 48, the cable 52 is wound or unwound by the winch 50 so that the door 40 may be automatically raised or lowered between its open and closed positions. A door switch 56 enables the door motor 48 to stop when the door 40 is closely confined against the gasket 46.

The device 10 also includes a blower means by which cold air is transferred through the housing 20 and exits as hot air for subsequent use. A cold air inlet 60 is located adjacent the base 21 of the housing 20 and permits cold air to enter the housing 20. The cold air passes from the cold air inlet 60 into a hot air collection chamber 62. In the hot air collection chamber 62, the cold air is warmed by the build-up of heat produced by the solar radiation impinging on the rock 17 contained within the wire mesh racks 15. The hot air collection chamber 62 is located between the front window 26 and the front face 22 of the housing 20. The hot air accumulating in the chamber 62 is removed from the chamber 62 by a squirrel cage fan 66 generally located adjacent the frame 16 above the wire mesh racks 15. The hot air is exited by the fan 66 to a hot air outlet 64 for subsequent discharge and use.

An insulating layer 25 also allows the hot air collection chamber 62 to reach a higher operating temperature since potential heat dissipation from the housing 20 is further reduced. The insulation material used for the insulating layer 25 is preferably fiber glass insulation, but other thermal insulating materials known to the art may be substituted.

FIGS. 1 and 2 illustrate the combined solar collector and storage device 10 in a generally vertical arrangement. The device 10 can also be designed in an angular arrangement wherein the front face 22 may be inclined to the vertical by some specific angle so that the device 10 can intercept the maximum potential solar radiation impinging on the surface at a particular geographic location.

In operation, the front insulation door 40 is moved to its open position during periods of sunlight, as shown in FIGS. 1 and 2. The sun's rays pass through the clear front window 26 of the housing 20 and directly impinge on the rock 17 filling the wire mesh racks 15 adjacent the front face 22. Interstitial spacing between the rock 17 allows a portion of the solar radiation to penetrate more deeply to the interior rock 17. This process aids the interior rock 17 in reaching its potential individual heating capacity so that overall hot air accumulated in the hot air collection chamber 62 is increased.

The solar radiation also directly penetrates deeply along the plurality of sunlight entry tunnels 32. The solar radiation passes through the sunlight entry tunnels 32 until such radiation reaches the intersection of the sunlight entry tunnels 32 and the inner chamber tunnels 34. The solar radiation traverses through the inner chamber tunnels 34 heating the interior rock 17. The arrangement of the plurality of intersecting tunnels 30 including the sunlight entry tunnels 32 and the inner chamber tunnels 34 increases the heat capacity of the interior rock 17. In this manner, the interior rock 17 also receives a generally even distribution of solar radiation thereby increasing the entire heating capacity of the mesh container 20.

The front insulating door 40 is moved between its open position, as shown in FIGS. 1 and 2, and its closed position (not shown). In the open position, solar radiation impinging on the door 40 is reflected onto the front face 22 of the housing 20 as the door 40 is coated with a sunlight reflecting surface. This increases the potential solar radiation which may be received by the housing 20.

In its closed position, the door 40 prevents accumulated heat from escaping out of the housing 20. The door 40 is closed during prolonged overcast conditions or at night by activating the door motor 48 which causes the winch 50 to rotate thereby winding the cable 52 around winch 50 and upwardly lifting the door 40 to its closed position. The door 40 is sealed tightly closely abutting the front window 26 by contacting a gasket 46. A door switch 56 shuts off the door motor 48 when the door 40 reaches its closed position. The door 40 can be returned to its open position in a similar manner.

Cold air enters the housing 20 through the cold air inlet 60. The cold air is accumulated in the hot air collection chamber 62 where the cold air is exposed to the heat which has accumulated within the rock 17 and is transferred by conduction to the hot air. The hot air contained within the hot air collection chamber 62 is moved out of the housing 20 for discharge through the hot air outlet 64 by means of a fan 66. The hot air is now ready for use, such as in the duct system of a structure.

While the preferred embodiments of the present invention have been described, it should be understood that various changes, adaptions and modifications may be made therein without departing from the spirit of the invention and the scope of the appended claims.

What is claimed is:

1. A combined solar collector and storage device for storing and collecting solar radiation for use above ground level for heating a building and usable with a quantity of rock comprising:

a plurality of intersecting tunnels formed of rigid mesh including a plurality of sunlight entry tunnels spaced from one another and a plurality of inner chamber tunnels spaced from one another, said sunlight entry tunnels having their longitudinal axes generally aligned with the direction of the sun's rays allowing the solar radiation to impinge directly into said sunlight entry tunnels, said inner chamber tunnels intersecting said sunlight entry tunnels at closely spaced intervals so that the solar radiation may be more effectively absorbed by the interior rock;

a housing including a plurality of wire mesh racks retaining and storing the rock therein and also including a front face formed of mesh allowing the solar radiation to impinge on the rock filling said housing and thereby penetrating deeply into said inner chamber tunnels to accelerate the heating of the interior rock;

said housing surrounding said wire mesh racks and said sunlight entry and inner chamber tunnels to isolate said racks and tunnels from the ambient environment and to retain accumulated heat energy within said enclosure;

a cold air inlet to permit cold air entry into said housing;

a hot air collection chamber for accumulating hot air within said housing;

a hot air outlet for directing hot air for discharge into the building; and a fan to remove the hot air from said hot air collection chamber to said hot air outlet.

2. The combined solar collector and storage device of claim 1 wherein:

said housing includes a base positionable on the ground level and permanently supported adjacent the ground level and also having a plurality of side walls permanently supported adjacent the ground level and also having a plurality of side walls permanently supported adjacent the ground level and a frame, said front face, said base, said frame and said side walls cooperating to form said housing and retain the rock within said housing.

3. The combined solar collector and storage device of claim 1 and further including:

a front insulating door which is hingedly connected to said base of said housing and is movable between an open position, wherein solar radiation is allowed to impinge directly onto said front face of said housing and a closed position, wherein said front insulating door is extended upwardly contacting said housing adjacent said front face thereby retaining solar energy within said housing during conditions when the sun's rays have been diminished.

4. The combined solar collector and storage device of claim 3 wherein:
said front insulating door includes a sunlight reflecting surface on its inner surface thereby reflecting solar radiation to said front face of said housing when said door is in said open position.

5. The combined solar collector and storage device of claim 3 wherein:
said housing includes a front window adjacent said front face and a gasket positioned about said front window permitting said front insulating door to sealably close against said front window when said door is in said closed position.

6. The combined solar collector and storage device of claim 3 and further including:
a door motor mounted to said housing and having a winch connected therewith; and
a cable extending from said front insulating door and engaging said winch so that said motor can move said door between said open and closed positions.

7. The combined solar collector and storage device of claim 6 and further including:
a door switch connected electrically with said door motor to interrupt current flow to said motor when said front insulating door is closely abutting against said front window.

8. The combined solar collector and storage device of claim 1 and further including:
a coating of flat energy absorptive material on the rocks to enhance energy absorption.

9. The combined solar collector and storage device of claim 2 and further including:
a plurality of support brackets disposed at generally even spaced intervals within said housing, said support brackets extending between said front face and said frame and being engaged to said frame, said support brackets permitting said wire mesh racks, said sunlight entry tunnels and said inner chamber tunnels to be stacked and spaced in a modular arrangement so that quantities of rock may be removably inserted within said housing.

10. The combined solar collector and storage device of claim 1 and further including:
a hot air discharge motor driving said fan so that the hot air may be removed from said hot air collection chamber to said hot air outlet for discharge into the building.

11. A combined solar collector and storage device for storing and collecting solar radiation for use above ground level for heating a building and usable with a quantity of rock comprising:
a plurality of intersecting tunnels being formed of rigid mesh including a plurality of sunlight entry tunnels spaced from one another and a plurality of inner chamber tunnels spaced from one another, said sunlight entry tunnels having their longitudinal axis generally aligned with the direction of the sun's rays allowing the solar radiation to impinge directly into said sunlight entry tunnels, said inner chamber tunnels intersecting said sunlight entry tunnels at closely spaced intervals so that the solar radiation may be more effectively absorbed by interior rock;
a housing including a plurality of wire mesh racks retaining and storing the rock therein and also including a front face formed of mesh allowing the solar radiation to impinge on the rock filling said housing and thereby penetrating deeply into said inner chamber tunnels to accelerate the heating of interior rock;
said housing having a base positionable on the ground level and permanently supported adjacent the ground level and also having a plurality of side walls and a rear wall, said front face, said base, said rear wall and said side walls cooperating to form said housing and retain the rock within said housing;
a front insulating door which is hingedly connected to said base of said housing and is movable between an open position, wherein solar radiation is allowed to impinge directly onto said front face of said housing, and a closed position wherein said front insulating door is extended upwardly contacting said housing adjacent said front face thereby retaining solar energy within said housing during conditions when the sun's rays have been diminished;
said front insulating door including a sunlight reflecting surface on its entire inner surface thereby reflecting solar radiation to said front face of said housing when said door is in said open position;
a cold air inlet to permit cold air entry into said housing;
a hot air collection chamber for accumulating hot air within said housing;
a hot air outlet for directing hot air for discharge into the building;
a fan to remove the hot air from said hot air collection chamber to said hot air outlet; and
a hot air discharge motor driving said fan so that the hot air may be removed from said hot air collection chamber to said hot air outlet for discharge into the building.

12. The combined solar collector and storage device of claim 11 wherein:
said housing includes a front window adjacent said front face and a gasket positioned about said front window permitting said front insulating door to sealably close against said front window when said door is in its closed position.

13. The combined solar collector and storage device of claim 11 and further including:
a door motor mounted to said housing and having a winch connected therewith; and
a cable extending from said front insulated door and engaging said winch so that said motor can move said door between said open and closed positions.

14. The combined solar collector and storage device of claim 13 and further including:
a door switch connected electrically with said door motor to interrupt current flow to said motor when said front insulating door is closely abutting against said front window.

15. The combined solar collector and storage device of claim 11 and further including:
a coating of flat energy absorptive material on the racks to enhance energy absorption.

16. The combined solar collector and storage device of claim 11 and further including:

a plurality of support brackets disposed at generally even spaced intervals within said housing, said support brackets extending between said front face and said frame and being engaged to said frame, said support brackets permitting said wire mesh racks, said sunlight entry tunnels and said inner chamber tunnels to be stacked and spaced in a modular arrangement so that quantities of rock may be removably inserted within said housing.

* * * * *